(12) United States Patent
O'Connor et al.

(10) Patent No.: US 10,743,142 B2
(45) Date of Patent: Aug. 11, 2020

(54) CONSTRUCTING A MAP OF A PHYSICAL SPACE

(71) Applicant: International Business Machines Corporation, Armonk, NY (US)

(72) Inventors: James P. O'Connor, White Plains, NY (US); Douglas A. Smalley, Clinton Corners, NY (US); Marie Cole, Wappingers Falls, NY (US); Brian R. Prasky, Campbell Hall, NY (US); Sierra R. F. Spring, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/142,739

(22) Filed: Sep. 26, 2018

(65) Prior Publication Data

US 2020/0100064 A1  Mar. 26, 2020

(51) Int. Cl.
*H04W 4/029* (2018.01)
*H04W 4/33* (2018.01)

(52) U.S. Cl.
CPC ............ *H04W 4/029* (2018.02); *H04W 4/33* (2018.02)

(58) Field of Classification Search
CPC .. G01C 21/206; G01C 21/32; G01C 21/3676; H04W 4/029; H04W 4/33
See application file for complete search history.

(56) References Cited

U.S. PATENT DOCUMENTS

| | | | |
|---|---|---|---|
| 9,307,368 B1* | 4/2016 | Bartlett | H04W 4/04 |
| 9,544,738 B1 | 1/2017 | Bartlett | |
| 2012/0278132 A1* | 11/2012 | Weigh | G06Q 30/0261 |
| | | | 705/7.34 |
| 2014/0256356 A1* | 9/2014 | Shen | H04W 4/023 |
| | | | 455/456.3 |
| 2015/0195730 A1* | 7/2015 | Siomina | H04W 24/08 |
| | | | 370/252 |
| 2016/0174185 A1* | 6/2016 | Ramakrishnan | H04W 64/006 |
| | | | 455/456.1 |
| 2017/0006429 A1* | 1/2017 | Douglas | H04W 4/027 |
| 2017/0186077 A1 | 6/2017 | Srinivasan et al. | |
| 2017/0272917 A1 | 9/2017 | Otis et al. | |
| 2018/0328753 A1* | 11/2018 | Stenning | G01C 21/08 |

* cited by examiner

*Primary Examiner* — Quoc Thai N Vu
(74) *Attorney, Agent, or Firm* — Cantor Colburn LLP; Tihon Poltavets

(57) ABSTRACT

Examples of techniques for constructing a spatial map of a physical space are disclosed. In one example implementation according to aspects of the present disclosure, a computer-implemented method includes collecting, by a processing device, signal strength data about a plurality of user devices as the plurality of user devices move throughout the physical space, the signal strength data being indicative of a signal strength of a wireless signal between at least one of the plurality of user devices and at least one of a plurality of access points associated with the physical space. The method further includes generating, by the processing device, a signal space map based at least in part on the signal strength data. The method further includes transforming, by the processing device, the signal space map of the physical space into the spatial map of the physical space to construct the spatial map of the physical space.

14 Claims, 12 Drawing Sheets

CONSTRUCTING A MAP OF A PHYSICAL SPACE

BACKGROUND

The present invention generally relates to mapping technologies, and more specifically, to constructing a spatial map of a physical space.

Maps of physical spaces are used to those navigating or moving within the physical spaces. For example, a map of a building can indicate rooms, obstacles, features, etc. within the physical space. Retailer stores may provide maps to their customers to aid the customers in navigating the store.

SUMMARY

Embodiments of the present invention are directed to a computer-implemented method for constructing a spatial map of a physical space. A non-limiting example of the computer-implemented method includes collecting, by a processing device, signal strength data about a plurality of user devices as the plurality of user devices move throughout the physical space, the signal strength data being indicative of a signal strength of a wireless signal between at least one of the plurality of user devices and at least one of a plurality of access points associated with the physical space. The method further includes generating, by the processing device, a signal space map based at least in part on the signal strength data. The method further includes transforming, by the processing device, the signal space map of the physical space into the spatial map of the physical space to construct the spatial map of the physical space.

Embodiments of the present invention are directed to a system. A non-limiting example of the system includes a memory comprising computer readable instructions and a processing device for executing the computer readable instructions for performing a method for constructing a spatial map of a physical space.

Embodiments of the invention are directed to a computer program product. A non-limiting example of the computer program product includes a computer readable storage medium having program instructions embodied therewith. The program instructions are executable by a processor to cause the processor to perform a method for constructing a spatial map of a physical space.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
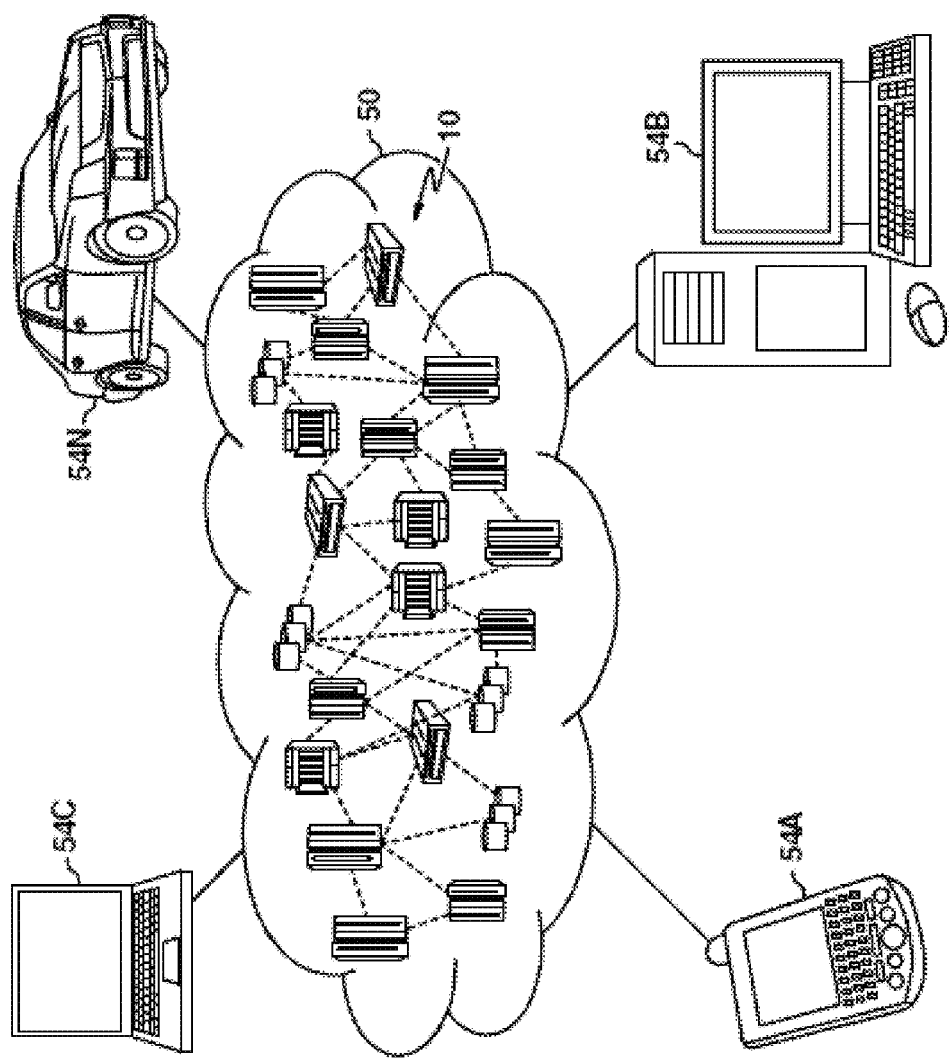
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
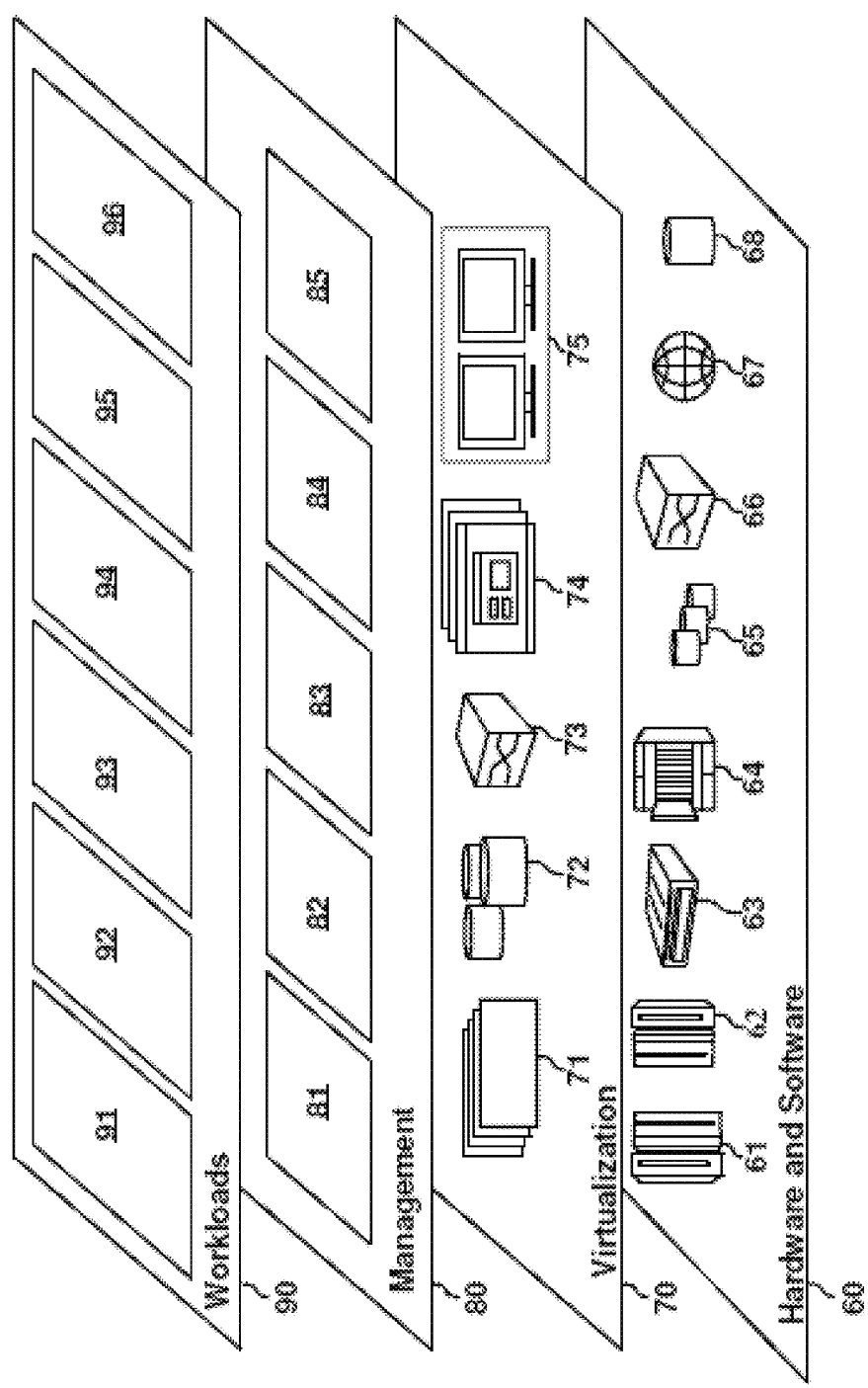
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical map construction 96.

Figure 3:
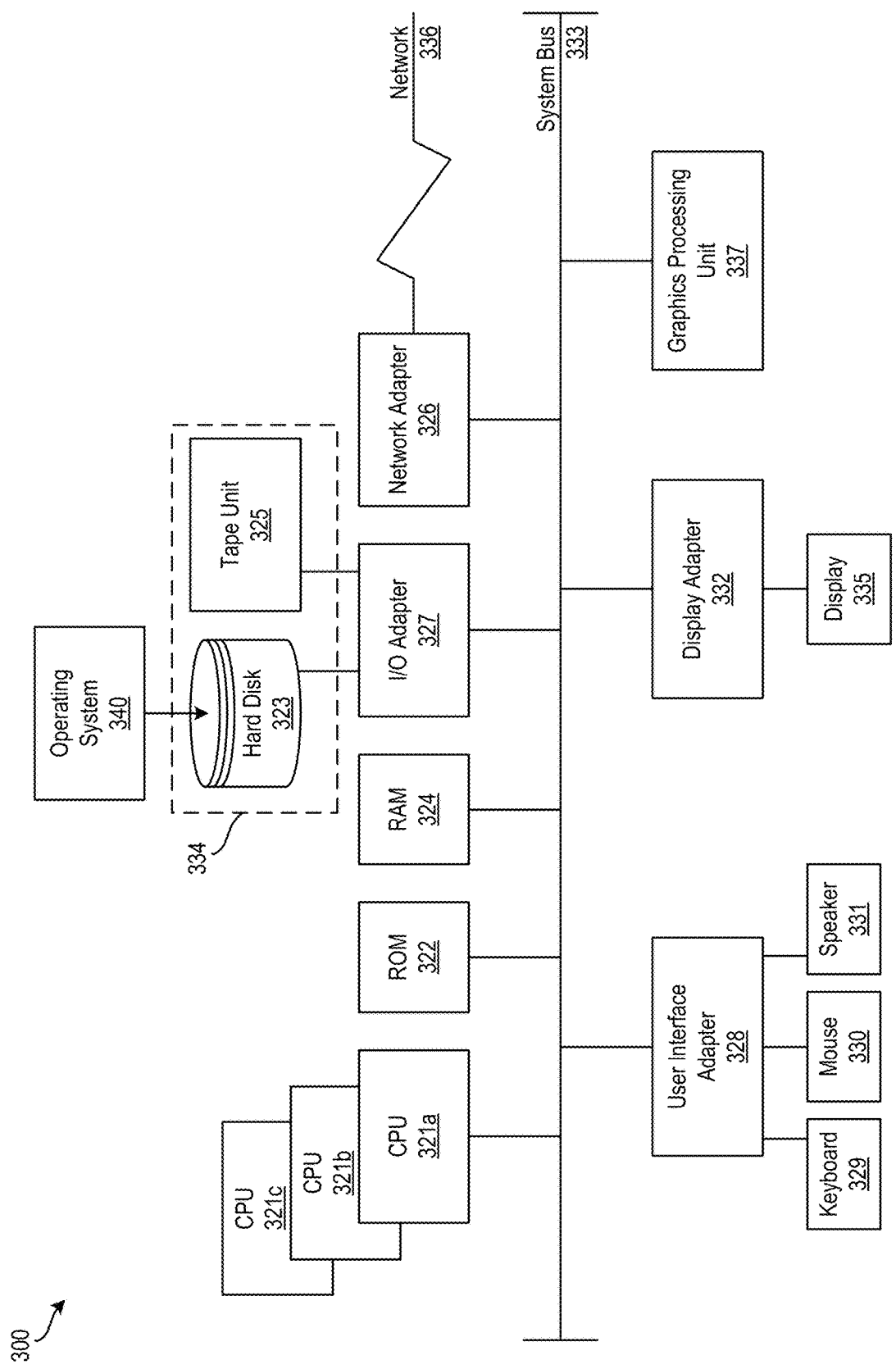
FIG. 3 depicts a block diagram of a processing system for implementing the present techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, the present techniques provide technical solutions that construct a spatial map of a physical space using a signal space map generated based on user device data.

For a physical space, such as a retail space or other building (e.g., a warehouse), it may be desirable to construct a digital spatial map of the physical space. The digital spatial map can be shared with customers, visitors, etc., used in promotional materials, uploaded to third-party applications, and the like. This can be useful to those entering and navigating the store. However, creating spatial maps is a time consuming, manual process, and once created, it is not easy to update the spatial maps. For example, retail stores often move displays, shelving units, promotion units, or even the entire department, for example, based on promotions, seasons, and the like.

Turning now to an overview of the aspects of the invention, one or more embodiments of the invention address the above-described shortcomings of the prior art by providing techniques for creating a special map of a physical space using data collected from user devices as users move throughout the physical space. To do this, the present techniques collect signal strength data about user devices as those devices move throughout a physical space. For example, devices can connect to access points within a physical space, such as wireless access points that provide networking and/or internet connectivity to the user devices. When the devices connect to access points, the location of these devices can be determined based on the signal strength of the wireless connections between the user devices and the access points. This signal strength data can be used to determine a location of the user device as it moves throughout the physical space. From this signal strength data, a signal space map can be generated, such as by triangulating a position of the user devices with respect to the physical space. The signal space map can be transformed into a spatial map as described herein.

The above-described aspects of the invention address the shortcomings of the prior art by tracking user devices within the physical space, using signal strength data of connections between the user devices and access points within the physical space to generate a signal space map, and transforming the signal space map into a spatial map of the physical space. This enables automated spatial map creation based on user device data. Basing the spatial map on user device data ensures that the spatial map can be dynamically updated to reflect real-time changes to the layout of the physical space.

Figure 4:
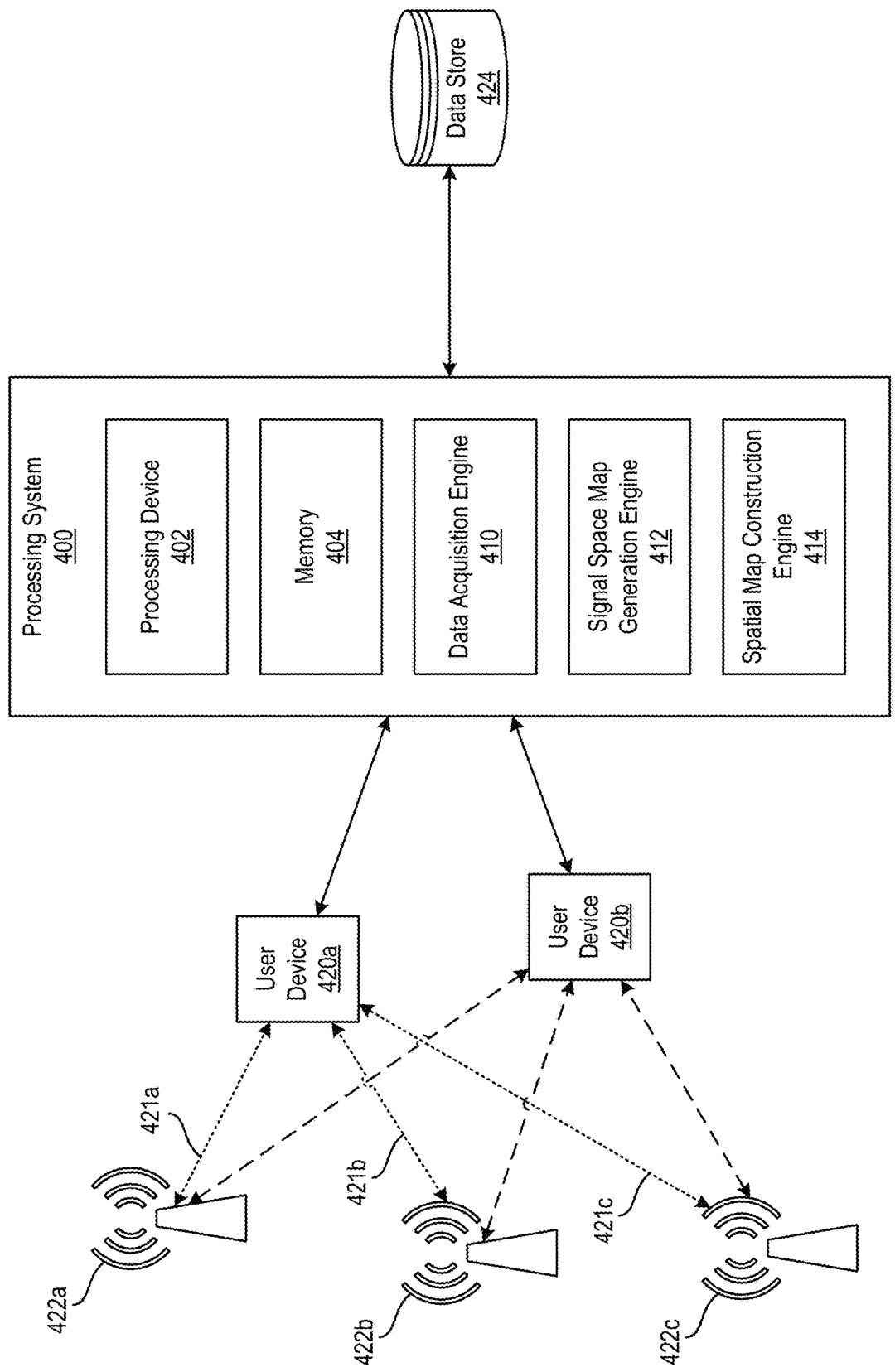
FIG. 4 depicts a block diagram of a processing system for constructing a spatial map of a physical space according to one or more embodiments described herein.

Turning now to a more detailed description of aspects of the present invention, FIG. 4 depicts a block diagram of a processing system 400 for constructing a spatial map of a physical space according to one or more embodiments described herein. The processing system 400 includes a processing device 402, a memory 404, a data acquisition engine 410, a signal space map generation engine 412, and a spatial map construction engine 414.

The data acquisition engine 410 acquires signal strength data from user devices 420a, 420b (collectively referred to as "user devices 420"). The signal strength data indicates a signal strength of a wireless signal between the user devices 420 and access points 422a, 422b, 422c (collectively referred to as "access points 422") located throughout a physical space. For example, the user device 420a connects to the access point 422a as shown by the wireless signal 421a, to the access point 422b as shown by the wireless signal 421b, and to the access point 422c as shown by the wireless signal 421c. The data acquisition engine 410 acquires signal strength data about the signal strength of each of the wireless signals 421a, 421b, 421c between the respective access points 422a, 422b, 422c and the user device 420a. The signal strength data can be received from and/or stored in a data store 424, for example.

The data acquisition engine 410 can triangulate a position of one or more of the user devices 420a, 420b using the signal strength of the wireless signal. For example, the data acquisition engine 410 can triangulate the position of the user device 420a within the physical space based on the wireless signals 421a, 421b, 421c. It should be appreciated that other techniques can be used to determine the location of the user devices within the physical space based on the devices' signal strength relative to one or more access points within the physical space.

Figure 5:
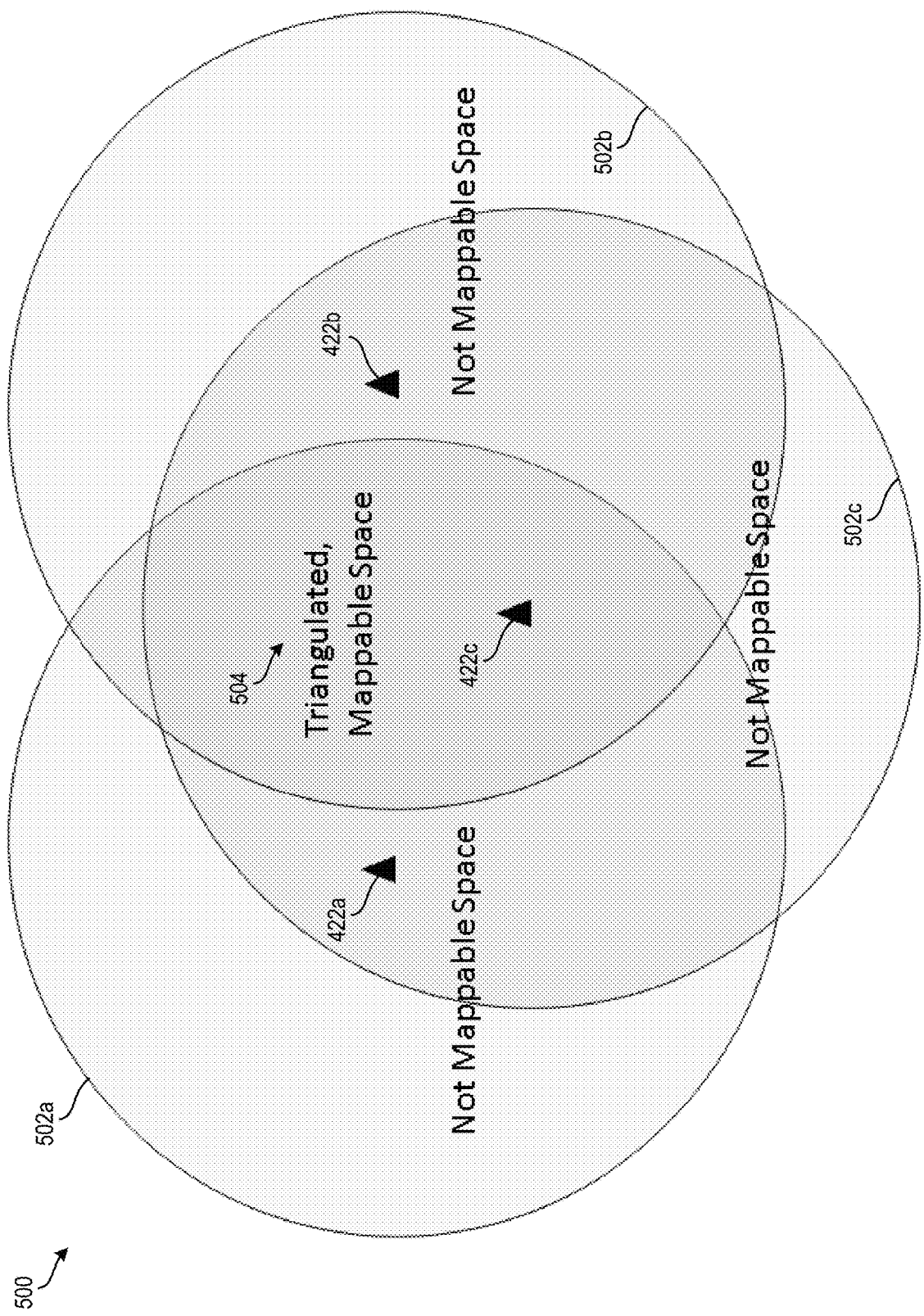
FIG. 5 depicts a graph of mappable space and non-mappable space for the access points of FIG. 4 according to one or more embodiments described herein.

FIG. 5 depicts a graph 500 of mappable space and non-mappable space for the access points 422 according to one or more embodiments described herein. The graph depicts the three access points 422a, 422b, 422c, each having a respective area of coverage 502a, 502b, 502c. The area of coverage for each access point represents the approximate range of the respective access point. Areas where the areas of coverage 502a, 502b, 502c overlap represents a mappable space 504 determined using a triangulation technique (or another suitable technique). Areas of coverage without overlap are non-mappable spaces. For example, if two areas of coverage 502a, 502b overlap with one another but not with the area of coverage 502c, this is a non-mappable space.

With continued reference to FIG. 4, the signal space map generation engine 412 can utilize the signal strength data to generate a signal strength map. The signal strength map depicts a location and/or path of a user device (e.g., one or more of the user devices 420) as the user device moves throughout the physical space. Examples of signal space maps are shown in the examples of FIGS. 6A, 6B, and 6C.

Figure 6A:
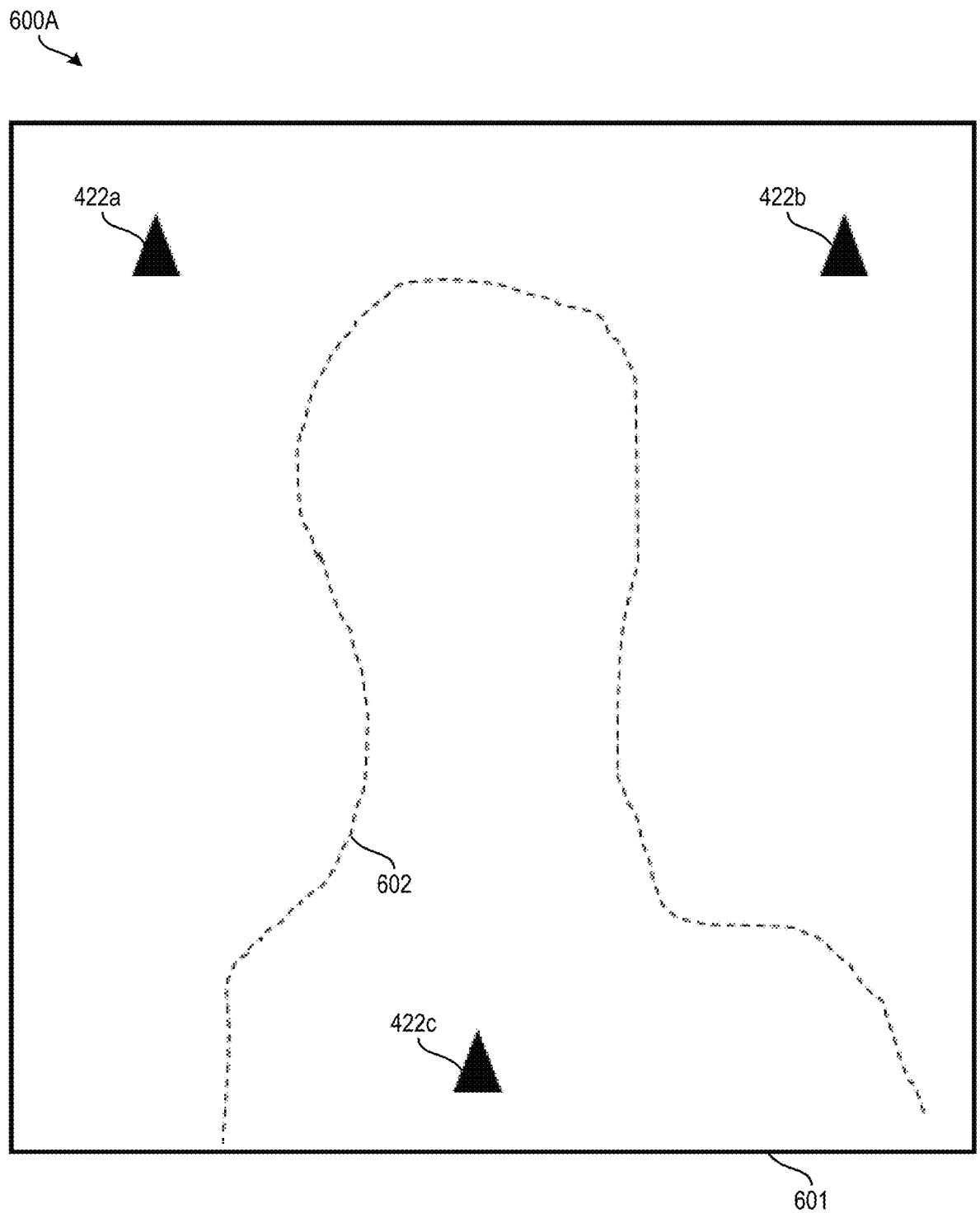
FIG. 6A depicts an early phase signal space map according to one or more embodiments described herein.

In particular, FIG. 6A depicts an early phase signal space map 600A of a physical space 601 according to one or more embodiments described herein. Access points 422a, 422b, 422c are located throughout the physical space 601. It should be appreciated that fewer or more access points can be used in accordance with the techniques described herein. The signal space map generation engine 412 determines a path 602 for a user device (e.g., the user device 420a, the user device 420b, etc.) through the physical space 601. The path 602 is determined based on the movement of the user device over time. Additional user devices can also be tracked, and additional paths can be determined, such as shown in FIG. 6B.

Figure 6B:
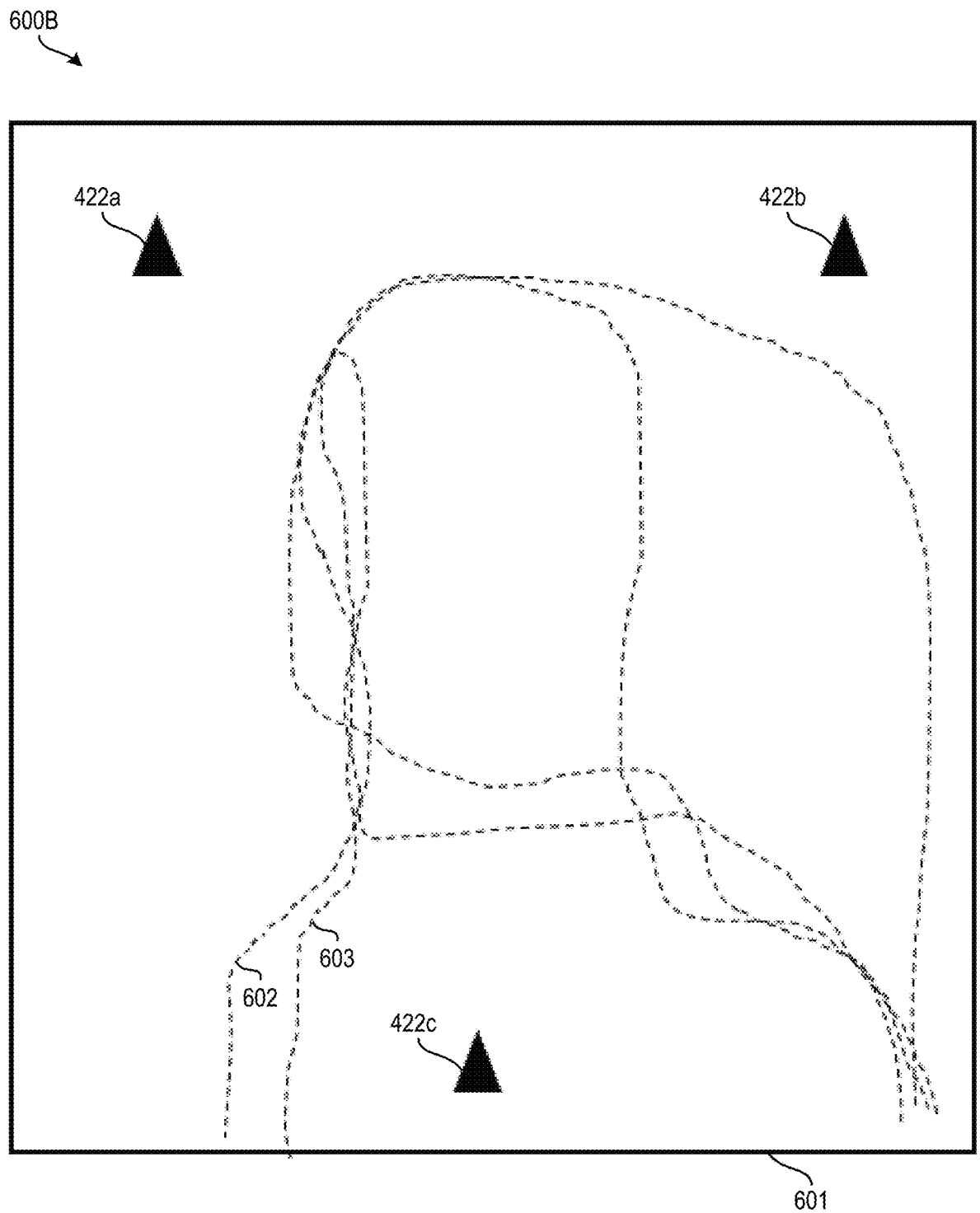
FIG. 6B depicts an intermediate phase signal space map according to one or more embodiments described herein.
Figure 6C:
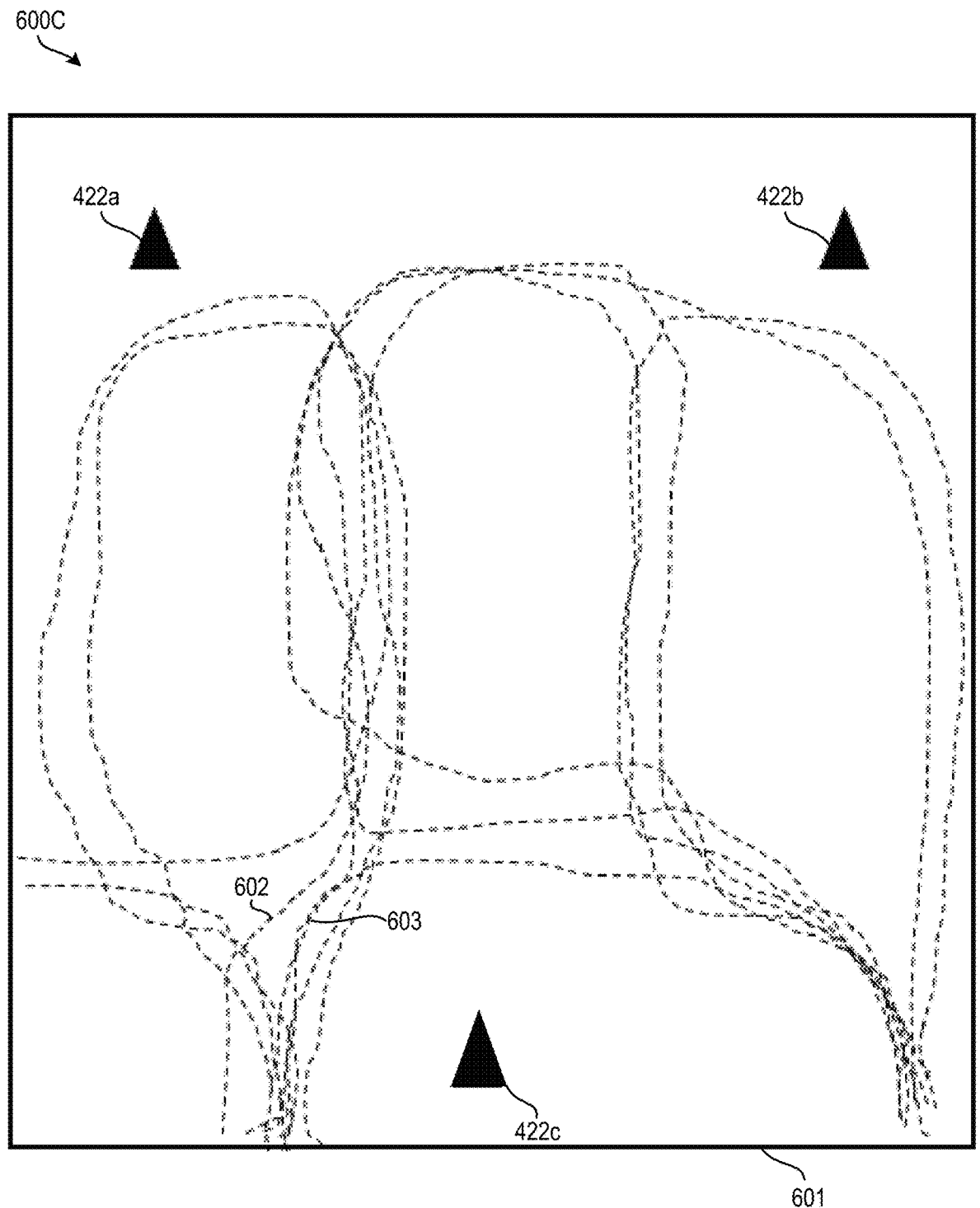
FIG. 6C depicts a late phase signal space map according to one or more embodiments described herein.

In particular, FIG. 6B depicts an intermediate phase signal space map 600B of the physical space 601 according to one or more embodiments described herein. The intermediate phase signal space map 600B shows multiple paths 602, 603, etc., which represent the movement of multiple user devices through the physical space 601. As additional user devices travel through the physical space 601, additional data is collected and a late phase signal space map 600C is created. For example, FIG. 6C depicts a late phase signal space map 600C of the physical space 601 according to one or more embodiments described herein.

Figure 6D:
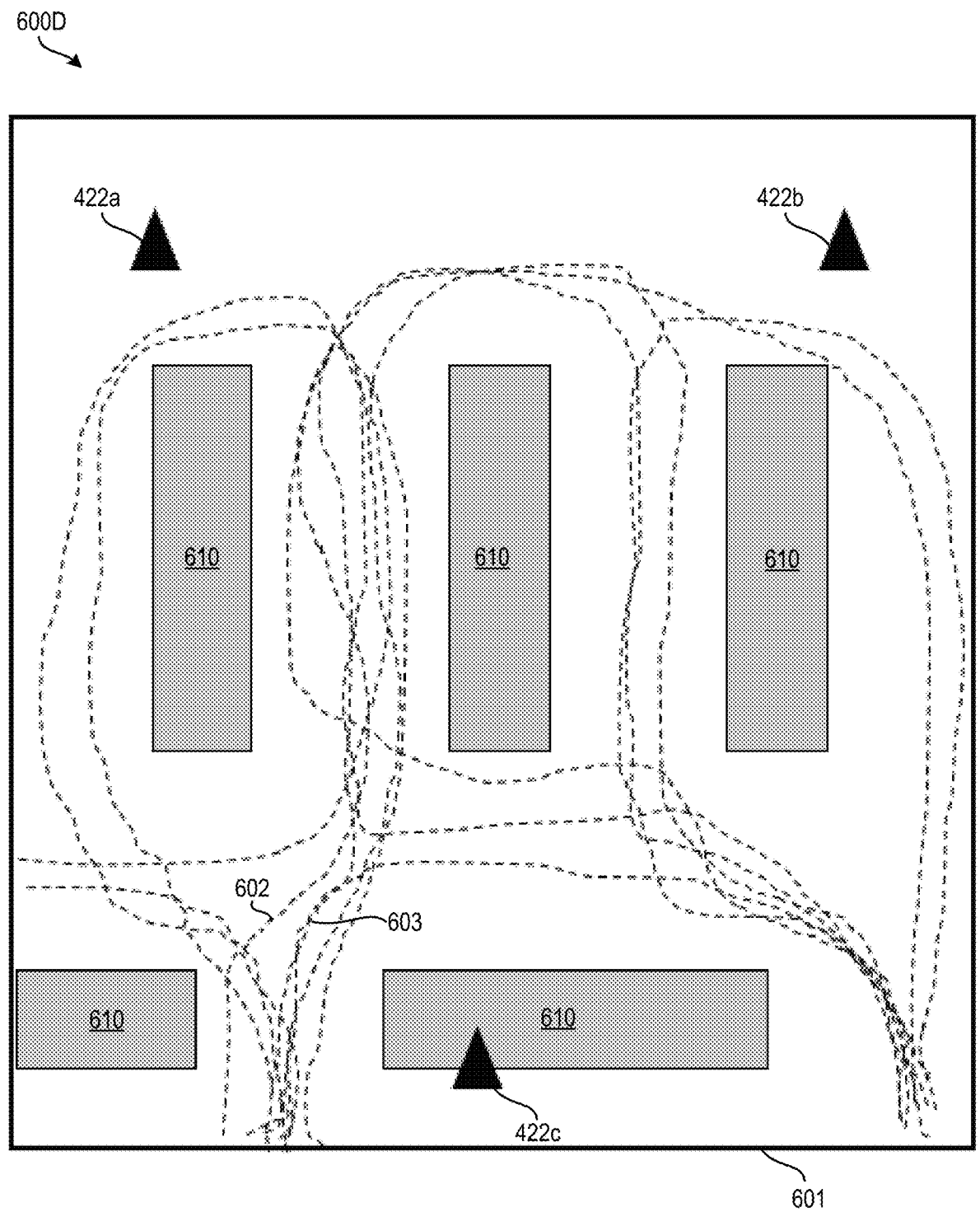
FIG. 6D depicts an example of a spatial map constructed by transforming the late phase signal space map of FIG. 6C according to one or more embodiments described herein.

With continued reference to FIG. 4, the spatial map construction engine 414 transforms the signal space map (e.g., the late phase signal space map 600C) into a spatial map of the physical space to construct the spatial map. For example, FIG. 6D depicts a spatial map 600D constructed by transforming the late phase signal space map 600C of the physical space 601 according to one or more embodiments described herein.

The spatial map construction engine 414 identifies potential obstacles 610 and identifies them on the spatial map 600D. According to one or more embodiments described herein, the spatial map construction engine 414 uses rules to identify the obstacles 610. For example, a rule could define an obstacle as being an area that does not contain any paths showing a user device traveling through the area. In an example in which the physical space 601 is a grocery store, this area can define a shelving unit, display unit, or other structure common to such physical spaces.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

Figure 7:
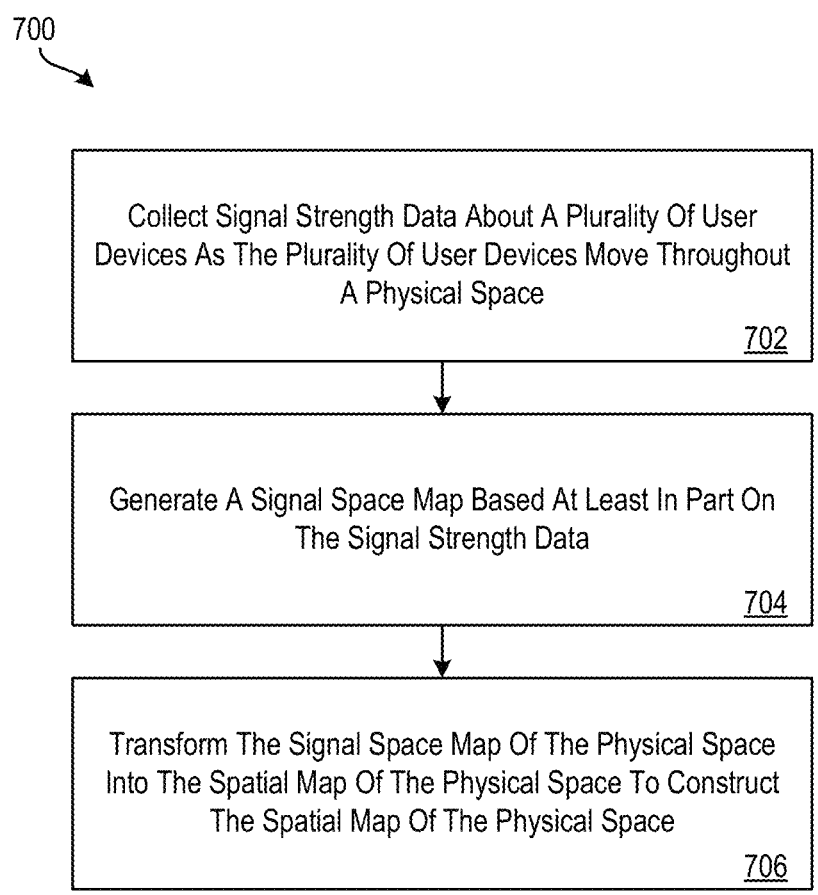
FIG. 7 depicts a flow diagram of a method for constructing a spatial map of a physical space according to one or more embodiments described herein.

Additional features and functionality of the processing system 400 is now described with reference to FIG. 7. In particular, FIG. 7 depicts a flow diagram of a method 700 for constructing a spatial map of a physical space according to one or more embodiments described herein. The method 700 can be implemented using any suitable processing system (e.g., the processing system 300, the processing system 400, the cloud computing environment 50, etc.) and/or any suitable processing device (e.g., the processing device 321, the processing device 402, etc.).

At block 702, the data acquisition engine 410 collects signal strength data about a plurality of user devices (e.g., the user devices 420) as the plurality of user devices move throughout a physical space. The user devices 420 connect wirelessly to one or more access points, such as the access points 422. The signal strength data indicates a signal strength of a wireless signal between at least one of the plurality of user devices and at least one of a plurality of access points associated with the physical space. For example, the signal strength data indicates a signal strength of a wireless signal 421a between the user device 420a and the access point 422a. The signal strength data can also consider wireless signals 421b, 421c between the user device 420a and other access points (e.g., the access points 422b, 422c). The signal strength data can include a time component, such as a time stamp, and a duration component, such as an amount of time the user device spent in different locations within the physical space. In some examples, the data acquisition engine 410 can account for environmental factors, such as temperature, humidity, etc., and can adjust the signal strength accordingly. This enables the location of the user devices within the physical space to be more accurate.

At block 704, the signal space map generation engine 412 generates a signal space map based at least in part on the signal strength data. According to one or more embodiments described herein, the signal map generation engine 412 generates the signal space map by triangulating a position of at least one of the user devices with respect to the physical space. This can further include determining a signal strength between at least one of the plurality of user devices and the at least one of the plurality of access points 422. In some examples, the triangulation is performed using signals between the user device (e.g., the user device 420a) and three wireless access points (e.g., the access points 422a, 422b, 422c). However, it some examples, it may be desirable to determine what floor of a multi-floor building the user device is on; accordingly, a fourth access device on a different floor can be used when performing the triangulation. According to one or more embodiments described herein, the access points 422 can be distributed across different floors of a multi-floor building.

Figure 8:
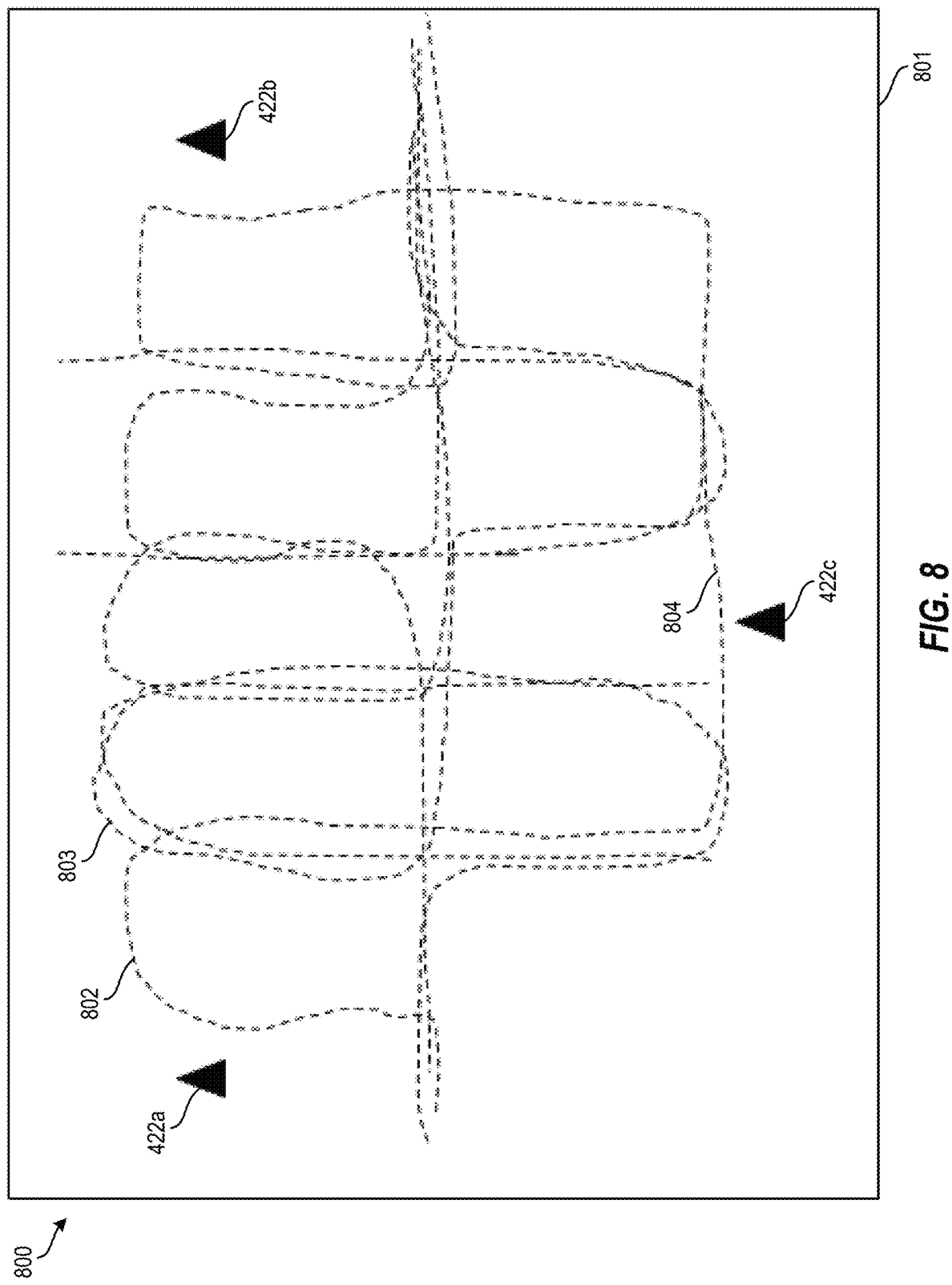
FIG. 8 depicts a signal space map of a physical space according to one or more embodiments described herein.

An example of the signal space map is depicted in FIG. 8. In particular, FIG. 8 depicts a signal space map 800 of a physical space 801 according to one or more embodiments described herein. The signal space map 800 includes multiple paths 802, 803, 804 and others that represent the paths that user devices (e.g., the user devices 420) took when moving throughout the physical space 801. The paths 802, 803, 804, etc. are determined using the signal strength data of wireless signals between the user devices 420 and the access points 422.

Figure 9:
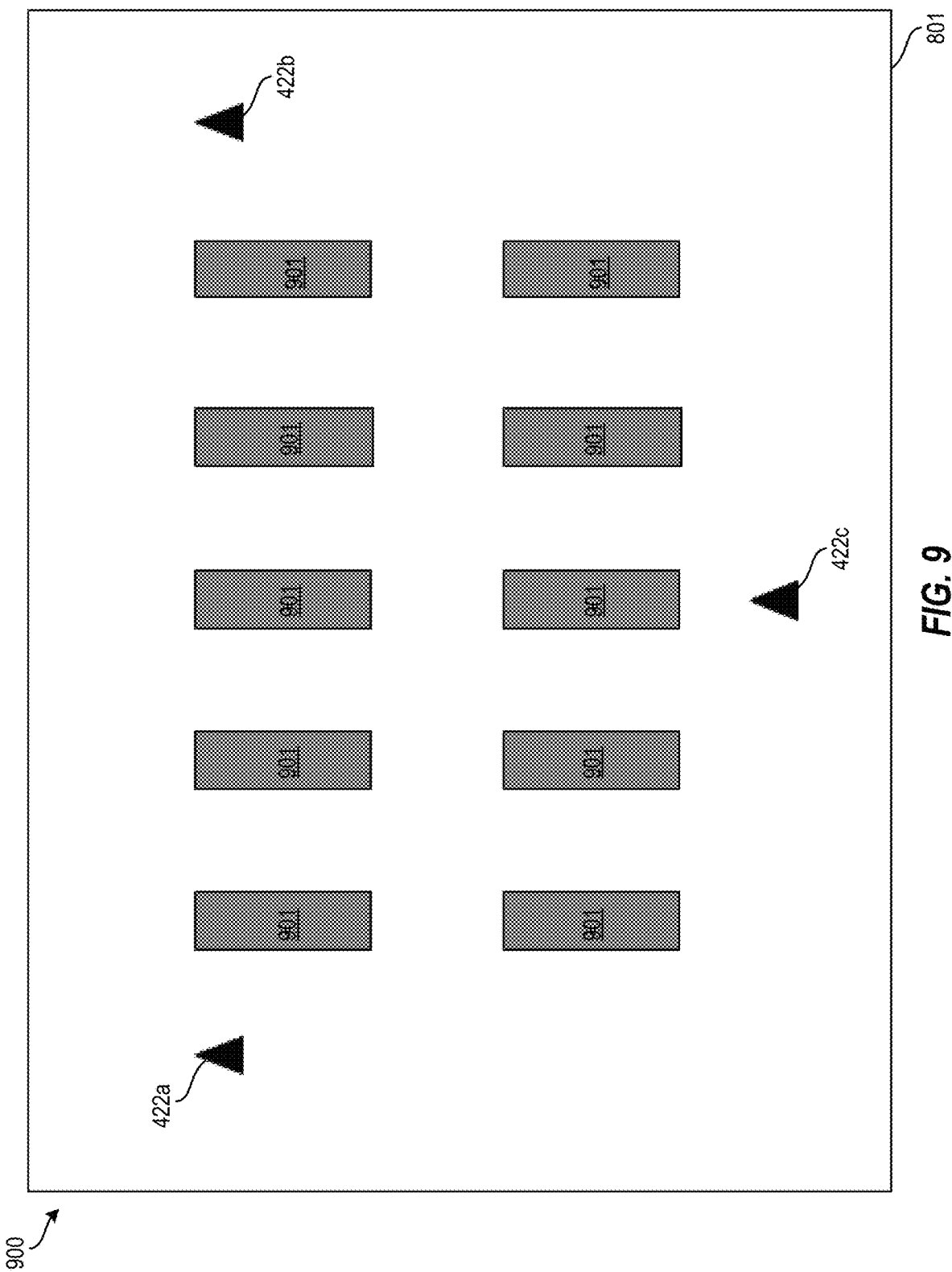
FIG. 9 depicts a spatial map of a physical space according to one or more embodiments described herein.

At block 706, the spatial map construction engine 414 transforms the signal space map of the physical space into the spatial map of the physical space to construct the spatial map of the physical space. An example of the spatial map is depicted in FIG. 9. In particular, FIG. 9 depicts a spatial map 900 of the physical space 801 according to one or more embodiments described herein. The spatial map 900 includes obstacles 901 that are determined based on the signal space map. According to one or more embodiments described herein, locations for the obstacles are determined based on the signal space map 800. For example, the paths 802, 803, 804, etc. are used to determine where obstacles are not, and the areas with no paths are then determined to include obstacles 901. In an example in which the physical space 801 is a retail store or supermarket, the obstacles 901 represent shelving units, displays, etc. within the physical space 801.

Additional processes also may be included, and it should be understood that the process depicted in FIG. 7 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for constructing a spatial map of a physical space, the method comprising:

collecting, by a processing device, signal strength data about a plurality of user devices as the plurality of user devices move throughout the physical space, the signal strength data being indicative of a signal strength of a wireless signal between at least one of the plurality of user devices and at least one of a plurality of access points associated with the physical space;
determining, for each of the plurality of user devices, on which of a plurality of floors the user device is located based at least in part on the signal strength data, wherein the plurality of access points comprises at least four access points, wherein at least a first of the at least four access points is associated with a first floor of the plurality of floors of the physical space and wherein at least a second of the at least four access points is associated with a second floor of the plurality of floors of the physical space;
adjusting, by the processing device, the signal strength data to account for an environmental factor, the environmental factor being at least one of a temperature or a humidity;
generating, by the processing device, a signal space map based at least in part on the signal strength data subsequent to adjusting the signal strength data, wherein the signal space map defines paths associated with the plurality of user devices; and
transforming, by the processing device, the signal space map of the physical space into the spatial map of the physical space to construct the spatial map of the physical space, wherein the spatial map includes an obstacle, the paths being used to determine a location of the obstacle, the location of the obstacle being distinct from the locations of the paths.

2. The computer-implemented method of claim 1, wherein generating the signal space map comprises triangulating a position of at least one of the plurality of user devices with respect to the physical space.

3. The computer-implemented method of claim 2, wherein triangulating the position of the plurality of user devices with respect to the physical space comprises determining the signal strength between at least one of the plurality of user devices and the at least one of the plurality of access points.

4. The computer-implemented method of claim 1, wherein a second and a third of the at least four access points are associated with one of the first floor or the second floor of the physical space.

5. The computer-implemented method of claim 1, further comprising:
collecting, by the processing device, additional signal strength data;
generating, by the processing device, an updated signal space map based at least in part on the signal strength data and based at least in part on the additional signal strength data; and
transforming, by the processing device, the updated signal space map into an updated spatial map of the physical space.

6. The computer-implemented method of claim 1, wherein the signal strength data comprises a time component and a duration component.

7. A system comprising:
a memory comprising computer readable instructions; and
a processing device for executing the computer readable instructions for performing a method for constructing a spatial map of a physical space, the method comprising:
collecting, by a processing device, signal strength data about a plurality of user devices as the plurality of user devices move throughout the physical space, the signal strength data being indicative of a signal strength of a wireless signal between at least one of the plurality of user devices and at least one of a plurality of access points associated with the physical space;
determining, for each of the plurality of user devices, on which of a plurality of floors the user device is located based at least in part on the signal strength data, wherein the plurality of access points comprises at least four access points, wherein at least a first of the at least four access points is associated with a first floor of the plurality of floors of the physical space and wherein at least a second of the at least four access points is associated with a second floor of the plurality of floors of the physical space;
adjusting, by the processing device, the signal strength data to account for an environmental factor, the environmental factor being at least one of a temperature or a humidity;
generating, by the processing device, a signal space map based at least in part on the signal strength data subsequent to adjusting the signal strength data, wherein the signal space map defines paths associated with the plurality of user devices; and
transforming, by the processing device, the signal space map of the physical space into the spatial map of the physical space to construct the spatial map of the physical space, wherein the spatial map includes an obstacle, the paths being used to determine a location of the obstacle, the location of the obstacle being distinct from the locations of the paths.

8. The system of claim 7, wherein generating the signal space map comprises triangulating a position of at least one of the plurality of user devices with respect to the physical space.

9. The system of claim 8, wherein triangulating the position of the plurality of user devices with respect to the physical space comprises determining the signal strength between at least one of the plurality of user devices and the at least one of the plurality of access points.

10. The system of claim 7, wherein a second and a third of the at least four access points are associated with one of the first floor or the second floor of the physical space.

11. The system of claim 7, wherein the method further comprises:
collecting, by the processing device, additional signal strength data;
generating, by the processing device, an updated signal space map based at least in part on the signal strength data and based at least in part on the additional signal strength data; and
transforming, by the processing device, the updated signal space map into an updated spatial map of the physical space.

12. The system of claim 7, wherein the signal strength data comprises a time component and a duration component.

13. A computer program product comprising:
a computer readable storage medium having program instructions embodied therewith, the program instructions executable by a processing device to cause the processing device to perform a method for constructing a spatial map of a physical space, the method comprising:
collecting, by a processing device, signal strength data about a plurality of user devices as the plurality of user devices move throughout the physical space, the signal strength data being indicative of a signal strength of a wireless signal between at least one of the plurality of user devices and at least one of a plurality of access points associated with the physical space;

determining, for each of the plurality of user devices, on which of a plurality of floors the user device is located based at least in part on the signal strength data, wherein the plurality of access points comprises at least four access points, wherein at least a first of the at least four access points is associated with a first floor of the plurality of floors of the physical space and wherein at least a second of the at least four access points is associated with a second floor of the plurality of floors of the physical space;

adjusting, by the processing device, the signal strength data to account for an environmental factor, the environmental factor being at least one of a temperature or a humidity;

generating, by the processing device, a signal space map based at least in part on the signal strength data subsequent to adjusting the signal strength data, wherein the signal space map defines paths associated with the plurality of user devices; and transforming, by the processing device, the signal space map of the physical space into the spatial map of the physical space to construct the spatial map of the physical space, wherein the spatial map includes an obstacle, the paths being used to determine a location of the obstacle, the location of the obstacle being distinct from the locations of the paths.

14. The computer-program product of claim 13, wherein generating the signal space map comprises triangulating a position of at least one of the plurality of user devices with respect to the physical space, wherein triangulating the position of the plurality of user devices with respect to the physical space comprises determining the signal strength between at least one of the plurality of user devices and the at least one of the plurality of access points.

* * * * *